United States Patent
Markman et al.

(10) Patent No.: US 12,423,590 B1
(45) Date of Patent: Sep. 23, 2025

(54) ARTIFICIAL INTELLIGENCE (AI) DRIVEN TAXONOMY FRAMEWORK GENERATION

(71) Applicant: FORESCOUT TECHNOLOGIES, INC., San Jose, CA (US)

(72) Inventors: Mae Markman, Eindhoven (NL); Maarten Dekker, Tilburg (NL); Ahmed Mosaad Yosef Jahin Kandil, Amsterdam (NL); Erenay Gencay, Helmond (NL); Rob Hulsebos, Helmond (NL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

(21) Appl. No.: 18/954,944

(22) Filed: Nov. 21, 2024

(51) Int. Cl.
  *G06F 21/73* (2013.01)
  *G06F 18/241* (2023.01)
  *G06N 5/01* (2023.01)

(52) U.S. Cl.
  CPC ............ *G06N 5/01* (2023.01); *G06F 18/241* (2023.01); *G06F 21/73* (2013.01)

(58) Field of Classification Search
  CPC ........ G06F 30/27; G06F 18/241; G06F 21/73; G06N 5/01
  See application file for complete search history.

(56) References Cited

U.S. PATENT DOCUMENTS

| | | | |
|---|---|---|---|
| 12,074,895 B1* | 8/2024 | Shen | H04L 63/0245 |
| 2024/0345551 A1* | 10/2024 | Ramanasankaran | G05B 13/027 |

OTHER PUBLICATIONS

Classifying IoT Devices in Smart Environment Using Network Traffic Characteristics (Year: 2019).*
A Survey of Smart Home IoT Device Classification Using Machine Learning Based Network Traffic Analysis (Year: 2022).*

* cited by examiner

*Primary Examiner* — Shirley X Zhang
(74) *Attorney, Agent, or Firm* — Womble Bond Dickinson (US) LLP

(57) ABSTRACT

Systems and methods for taxonomy framework generation are described. Methods include generating and providing a first prompt to a generative artificial intelligence (AI) model including a request to generate options for classification of network entities at a first classification granularity level and receiving, from the generative AI model, a first set of options for network entity classification. The method further includes generating and providing a second prompt to the generative AI model including a request to generate options for classification of network entities at second classification granularity level, receiving, from the generative AI model, a second set of options for network entity classification, and determining a taxonomy framework for classification of network entities based on the first set of options and the second set of options for network entity classification.

20 Claims, 11 Drawing Sheets

ARTIFICIAL INTELLIGENCE (AI) DRIVEN TAXONOMY FRAMEWORK GENERATION

TECHNICAL FIELD

Aspects and implementations of the present disclosure relate to entity classification for network monitoring, and more specifically, generating, via a generative artificial intelligence (AI) model, a taxonomy framework used for entity classification.

BACKGROUND

As technology advances, the number and variety of devices or entities that are connected to communications networks are rapidly increasing. Each device or entity may have its own respective vulnerabilities which may leave the network open to compromise or other risks. Preventing the spreading of an infection of a device or entity, or an attack through a network can be important for securing a communication network. Accordingly, devices or entities can be identified or classified for application of various network security measures.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
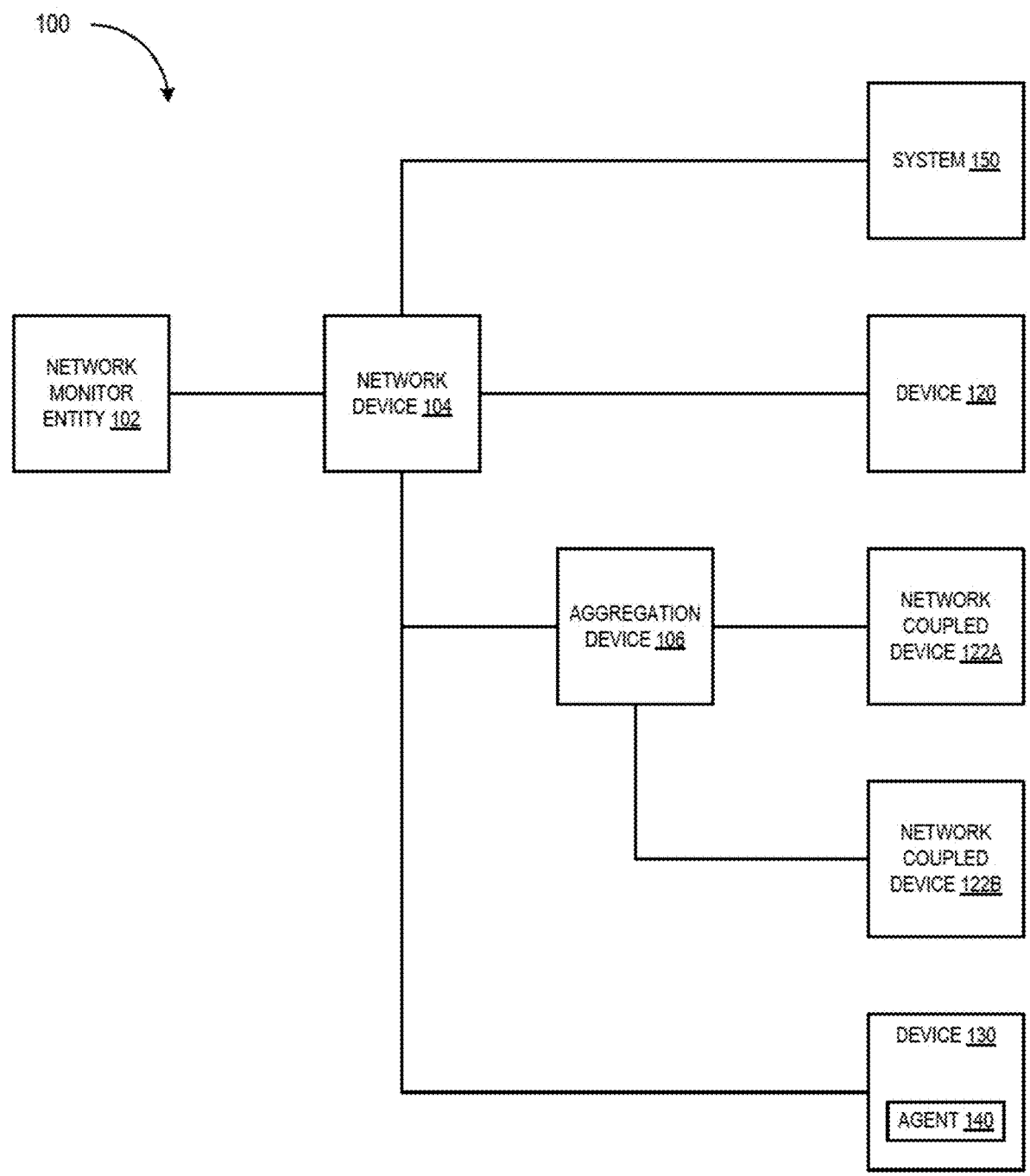
FIG. 1 depicts an illustrative communication network in accordance with one implementation of the present disclosure.

Aspects and implementations of the present disclosure are directed to taxonomy framework generation using a generative artificial intelligence (AI) model. The systems and methods disclosed can be employed with respect to network security, among other fields. More particularly, it can be appreciated that devices or entities with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained.

Conventionally, devices have been categorized or classified using specific classification paths embedded within a classification tree, defining potential taxonomies. Generating and managing such unique taxonomies for devices may include extensive manually intensive work including market research, industry insight, and customer feedback. As more and more devices are introduced to the market, the resources required for management of device taxonomies continues to increase exponentially.

For example, when a new device is introduced, developers may manually assign a classification path based on their best judgement, which involves analyzing existing taxonomies and determining if the device can be accommodated within these pre-existing categories or if there is a necessity to expand the current taxonomy framework. Expansion of the taxonomy framework within a classification tree denotes the addition of a new 'leaf or subclass to the current path. As an example, consider an existing path in a current classification tree as: Information Technology/Computer/Laptop. Here, a developer may extend the taxonomy if there is not a proper classification path in the current classification tree, deriving a new pathway from the existing one, for example leading to: Information Technology/Computer/Laptop/Rugged Laptop. In this scenario, "Rugged Laptop" becomes the added 'leaf.

To better segment or otherwise manage network security of entities of a network, entities may be classified based on various characteristics such as vendor, model, role, operating system (OS), version, etc. Conventionally, the determination of role, OS, and version properties have been realized using rules, unique fingerprints, and many other decision-making processes. Additionally, when one or more of the characteristics are determined, those determined characteristics can inform the classification of additional characteristics of the entity. Conventional methods, however, are not scalable or sustainable to create and maintain this matching between every unique vendor-model combination and its respective role as tens of thousands of new devices or more are newly classified every day.

Embodiments of the present disclosure provide for creating taxonomy trees for the various classification characteristics of network entities using iterative and chained prompts to a generative AI model. For example, each prompt to the generative AI model may include a request to generate a set of options within a particular context (e.g., within the context of a parent classification in a taxonomy tree). Accordingly, the iterative prompting may produce a taxonomy framework with various levels or resolutions defined within a taxonomy tree (e.g., a directed tree). Thus, a taxonomy framework may be generated for all available information automatically (e.g., without manual intervention). Additionally, using a prior generated tree as context, the taxonomy framework can be dynamically updated and maintained to continuously and impartially maintain a taxonomy framework at scale. Once the taxonomy framework is created and up to date, embodiments may use the taxonomy framework to determine a role or function of a device in a network. In some embodiments, the generative AI model may further be used to perform the classification of a device within the previously defined taxonomy framework.

In some embodiments, the AI classification model may determine that the entity to be classified cannot be classified within one of the defined classifications of the classification tree. In such a case, the AI classification model may generate a new classification option within the taxonomy framework.

Embodiments described herein provide advantages over conventional taxonomy framework management, including reducing time and labor required for taxonomy framework management, improving accuracy and reliability of entity classification. Additionally, embodiments provide for comprehensive taxonomy definition with independence with respect to a given inventory of devices, up-to-date information generated at request, and scalability of taxonomy framework management. Furthermore, use of a taxonomy framework generated according to embodiments described herein provide for uniform coverage across classification engines, cross-platform consistency, and precision of classification all due to the consistency and comprehensive coverage of the generated taxonomy framework.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which an entity can access or communicate with. Segmentation or "zoning" can provide effective controls to limit movement across the network (e.g., by a hacker or malicious software). Enforcement points including firewalls, routers, switches, cloud infrastructure, other network devices/entities, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its entities and the amount of work or labor involved in configuring network entities. Accordingly, the generation and use of a taxonomy framework may assist proper application of segmentation policies and rules based on entity or device classifications (e.g., role or function).

Although some embodiments are described herein with reference to network devices, embodiments also apply to any entity communicatively coupled to the network. An entity or entities, as discussed herein, include devices (e.g., computer systems, for instance laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, accounts, and users. Depending on the entity, an entity may have an IP address (e.g., a device) or may be without an IP address (e.g., a serverless service).

The enforcement points may be one or more network entities (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any entity that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122A-B. The devices 120 and 130 and network coupled devices 122A-B may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices/entities of communication network 100 may communicate in a variety of ways including wired and wireless connections and may use one or more of a variety of protocols.

Network device 104 may be one or more network entities configured to facilitate communication among aggregation device 106, system 150, network monitor entity 102, devices 120 and 130, and network coupled devices 122A-B. Network device 104 may be one or more network switches, access points, routers, firewalls, hubs, etc.

Network monitor entity 102 may be operable for a variety of tasks such entity classification and taxonomy framework management via an AI classification model using a defined taxonomy framework, as described herein. Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, a SPAN (Switched Port Analyzer) port, etc.). In some embodiments, network monitor entity 102 may include one or more of the aforementioned devices. In various embodiments, network monitor entity 102 may further support high availability and disaster recovery (e.g., via one or more redundant devices).

Network monitor entity 102 may perform entity classification using a taxonomy framework generated using a generative AI model. In some examples, the network monitor entity 102 may identify information associated with an entity (e.g., via network monitoring, from a device database, etc.) to be classified. In some embodiments, the network monitor entity 102 may provide the information associated with the entity to a classification model to perform a classification of the model (e.g., to determine a role or function of the entity) based on the previously generated taxonomy framework. In some embodiments, the network monitor entity 102 may iteratively generate prompts or queries to an AI classification model based on the identified information of the entity and the defined taxonomy framework. Each prompt may include the identified information of the entity and a set of potential classifications of the entity at a particular granularity within the taxonomy framework. For example, the network monitor entity 102 may begin with a prompt to classify the entity at the lowest granularity (e.g., broadest classification) in the taxonomy framework and once a classification is selected, the network monitor entity may proceed with generating a query for the next level of granularity within the taxonomy framework (e.g., including the child nodes of the previously selected classification). Additionally, the network monitor entity 102 may include a request to generate a new classification of the entity if no classification can be selected at any given level. Thus, the network monitor entity 102 may perform a classification within the context of the defined taxonomy framework.

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or 3rd party systems (e.g., system 150) may further be used for determining one or more tags or characteristics for an entity. For example, a vulnerability assessment (VA) system may be queried to verify or check if an entity is in compliance and provide that information to network monitor entity 102. External or 3rd party systems may also be used to perform a scan or a check on an entity to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122A-B. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122A-B on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to an entity being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network entities (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other entities (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122A-B and provide network access to network coupled devices 122A-B. Aggregation device 106 may further be configured to provide information (e.g., operating system, device software information, device software versions, device names, application present, running, or both, vulnerabilities, patch level, etc.) to network monitor entity 102 about the network coupled devices 122A-B. Aggregation device 106 may be a wireless access point that is configured to communicate with a wide variety of entities through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122A-B via a wireless connection. Aggregation device 106 may be configured to communicate with network coupled devices 122A-B using a standard protocol with proprietary extensions or modifications.

Aggregation device 106 may further provide log information of activity and attributes of network coupled devices 122A-B to network monitor entity 102. It is appreciated that log information may be particularly reliable for stable network environments (e.g., where the types of entities on the network do not change often). The log information may include information of updates of software of network coupled devices 122A-B.

Figure 2:
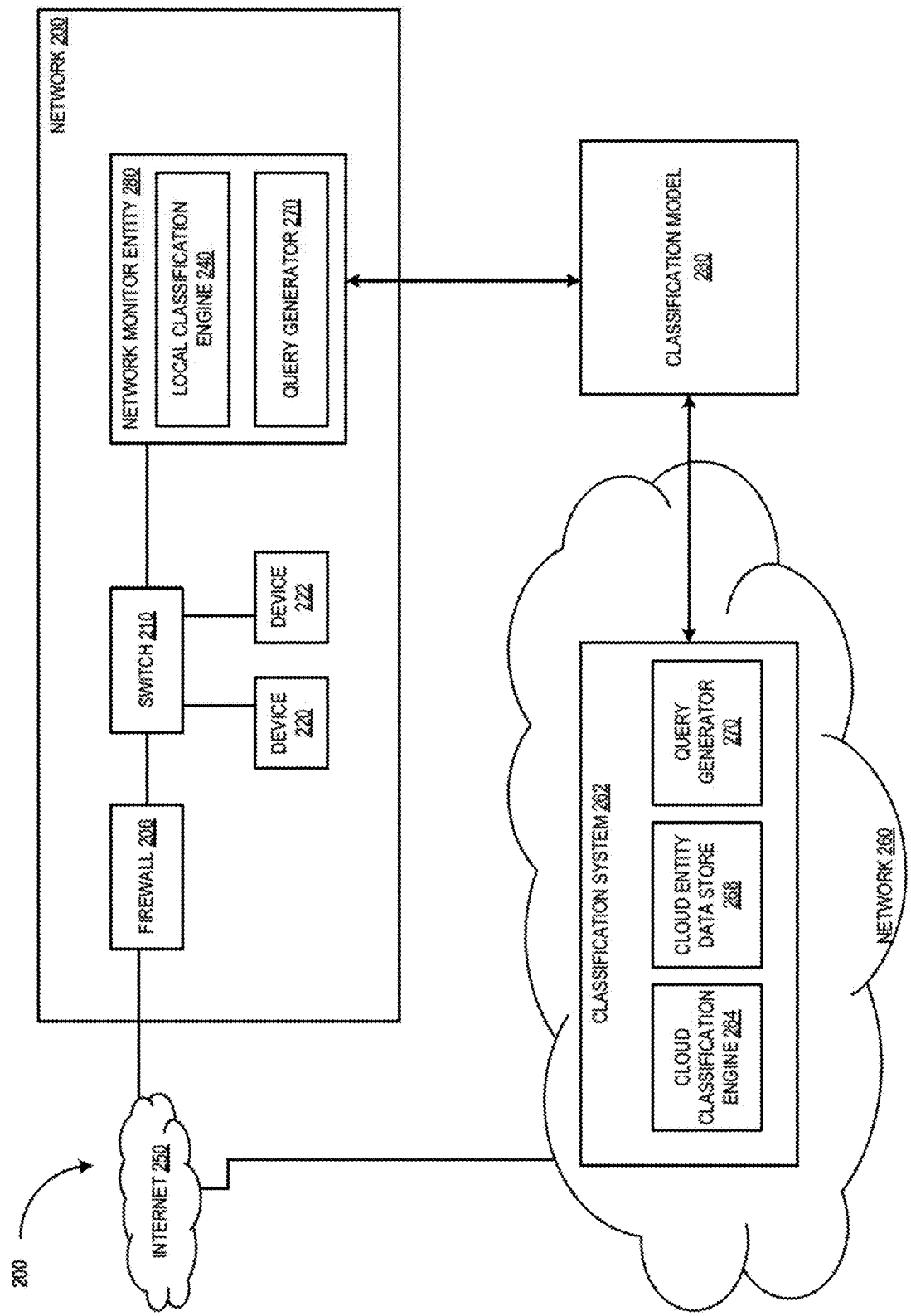
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor entity 280 (e.g., network monitor entity 102) which can perform entity classification within the context of a defined taxonomy framework generated via a generative AI model, as described herein, associated with the various entities communicatively coupled in example network 200.

FIG. 2 further shows example devices 220-222 (e.g., devices 106, 122A-B, 120, and 130, other physical or virtual devices, other entities, etc.) and it is appreciated that more or fewer network entities or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based entity or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various entities of network 200 including firewall 206, network monitor entity 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of an entity of network 200 by sending one or more requests to the entity of network 200. The information from passive and active scans of entities of network 200 can be used to determine one or more features associated with the entities of network 200 (e.g., evidence).

Network monitor entity 280 includes local classification engine 240 and query generator 270. Local classification engine 240 may perform classification of the entities of network 200 including firewall 206, switch 210, and devices 220-222. Local classification engine 240 may designate attributes and classify one or more entities of network 200 based on the information collected about, or otherwise associated with the entities. For example, local classification engine 240 may either locally perform a classification of an entity or otherwise use the query generator 270 to prompt a classification model 280 to classify entities coupled to the network 200 within a taxonomy framework previously generated via a generative AI model. In some embodiments, local classification engine 240 can also send data (e.g., attribute values) about entities of network 200, as determined by local classification engine 240, to classification system 262 of network 260, described in more detail below. Network 260 may be a cloud-based network (e.g., private or public cloud) of interconnected computing devices for providing computing services. Local classification engine 240 may encode and encrypt the data prior to sending the data to classification system 262. Local classification engine 240 may receive a classification from classification system 262 which network monitor entity 280 can use to perform various security related measures. In some embodiments, classification of an entity may be performed in part by local network monitor entity 280 (e.g., local classification engine 240) and in part by classification system 262 (e.g., cloud classification engine 264).

Classification system 262 may be a cloud classification system operable to perform entity classification based on a taxonomy framework generated via a generative AI model, as descried herein. In some examples, classification system 262 may use query generator 270 to generate prompts to classification model 280 to classify entities within the defined taxonomy framework. In some embodiments, classification system 262 may be part of a larger system operable to perform a variety of functions, e.g., part of a cloud-based network monitor entity, security device, etc. For example, classification system 262 can collect information associated with entities of network 200 and store the information at cloud entity data store 268 to be used for classifying of the entities of the network 200.

In some examples, cloud classification engine 264 may perform classification of devices of the network 200 (e.g., devices 220-222) by generating prompts (e.g., via query generator 270) to a classification model 280, such as a large language model. For example, cloud classification engine 264 may instruct query generator 270 to iteratively generate prompts to the classification model 280 to classify a device at various levels of the previously generated taxonomy framework using information associated with the device, such as device profiles (e.g., device properties, features, attributes, characteristics, etc. collected by network monitor entity 280) stored at cloud entity data store 268.

Figure 3:
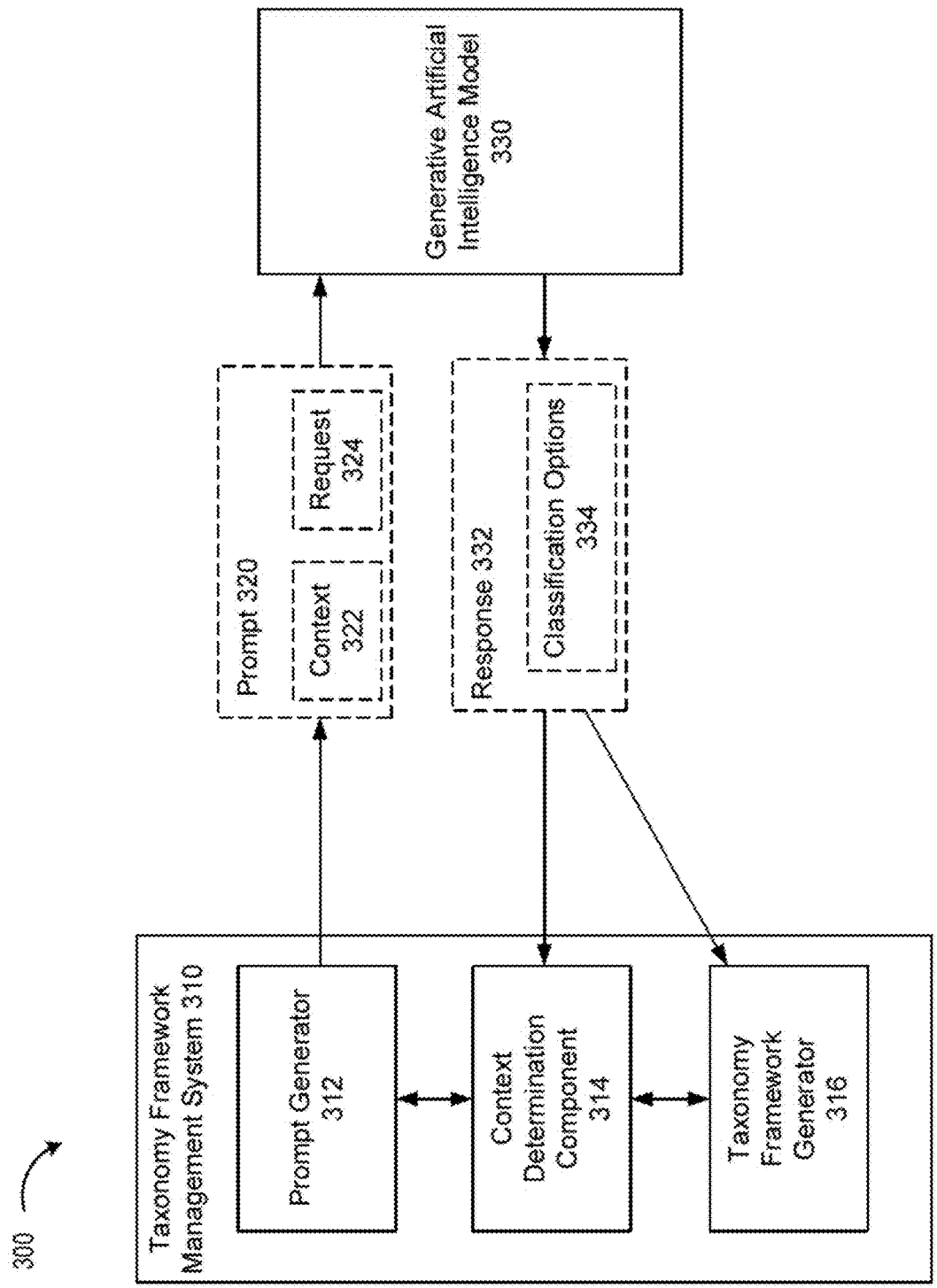
FIG. 3 depicts an example of a system for taxonomy framework generation, according to some embodiments of the present disclosure.

FIG. 3 depicts an example of a system 300 for taxonomy framework generation, according to some embodiments of the present disclosure. System 300 includes a taxonomy framework management system 310 and a generative AI model 330 for generating a taxonomy framework. The taxonomy framework management system 310 may include a prompt generator 312, a context determination component 314, and a taxonomy framework generator 316. The prompt generator 312 of the taxonomy framework management system 310 may generate a prompt 320 to the generative AI model 330. The prompt 320 may include a context 322 and a request 324 for the generative AI model 330 to generate classification options or categories based on the context 322. For example, the context 322 may include a broader category in which the request 324 is to operate. The request 324, for example, may include a request to generate additional categories within the broader category context. As an example, the context may include information technology (IT) and the prompt may request the generative AI model to generate categories or classifications of entities that fall under IT (e.g., types of IT devices). The generative AI model 330 may then generate a response 332 including classification options 334 based on the prompt 320.

The context determination component 314 may operate in conjunction with the prompt generator 312 to both determine the context 322 for the prompt 320 and to determine the context for the response 332 and a next prompt. For example, the context determination component 314 may select or identify a prior generation classification option and provide that option to the prompt generator 312 as the context for the prompt to generate another level of classification granularity within that context. Furthermore, the context determination component 314 may operate to identify and place newly received classification options 334 of the response within the proper context upon generating or updating the taxonomy framework via the taxonomy framework generator 316. In some embodiments, the taxonomy framework generator 316 may generate a taxonomy framework after all prompts to the generative AI model 330 have been provided and completed and then combine all the received classification options into a taxonomy tree based on the context of the each of the prompts. In other embodiments, the taxonomy framework generator 316 may update a taxonomy tree after each response from the generative AI model 330 is received. For example, taxonomy framework generator 316 may create a taxonomy framework including a taxonomy tree as depicted in FIG. 4.

Figure 4:
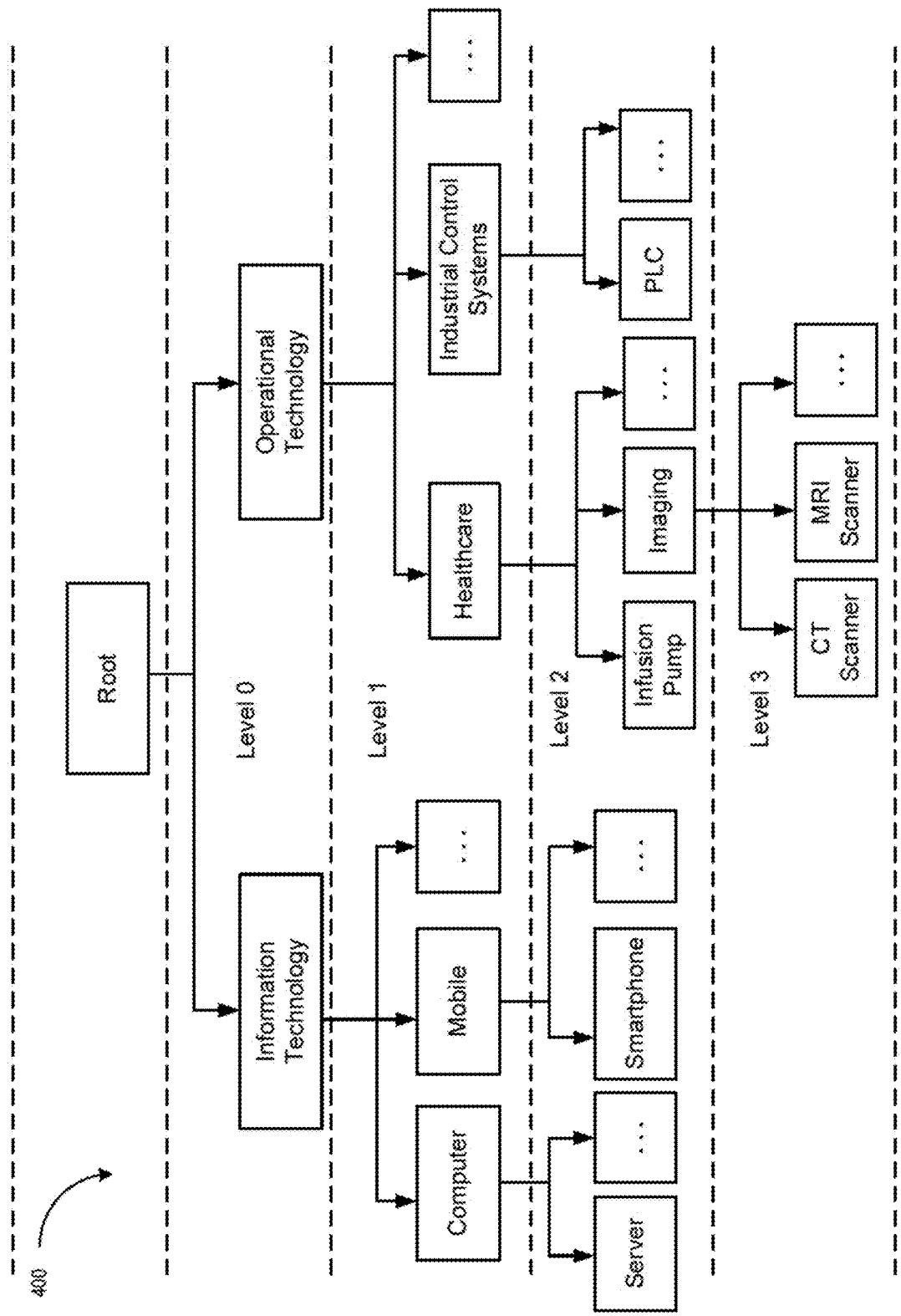
FIG. 4 depicts an example taxonomy framework represented by a taxonomy tree, according to some embodiment of the present disclosure.

FIG. 4 illustrates an example device classification taxonomy framework depicted as a directed classification tree. A device classification taxonomy may be represented by a sequence of string labels from the root to the highest-level classification. The level of a node corresponds to the depth of the node in the tree (i.e., the length of the path to the root). In some examples, a specific node of the framework may be denoted by the sequence of labels from the root to the node, e.g., "/IT/Networking/Router" denotes a router. As depicted, several possible classification options may be determined and included in a taxonomy tree. Although each level depicts certain defined classifications, it should be noted that any number of classification options can be determined at each level. For example, although level 0 depicts information technology and operational technology, a taxonomy tree generated via a generative AI model may include additional classifications at level 0, such as medical, information of things (IoT), network devices, and so forth. Alternatively, in some examples, such categories or classifications may be determined at other levels of the taxonomy tree.

Figure 5:
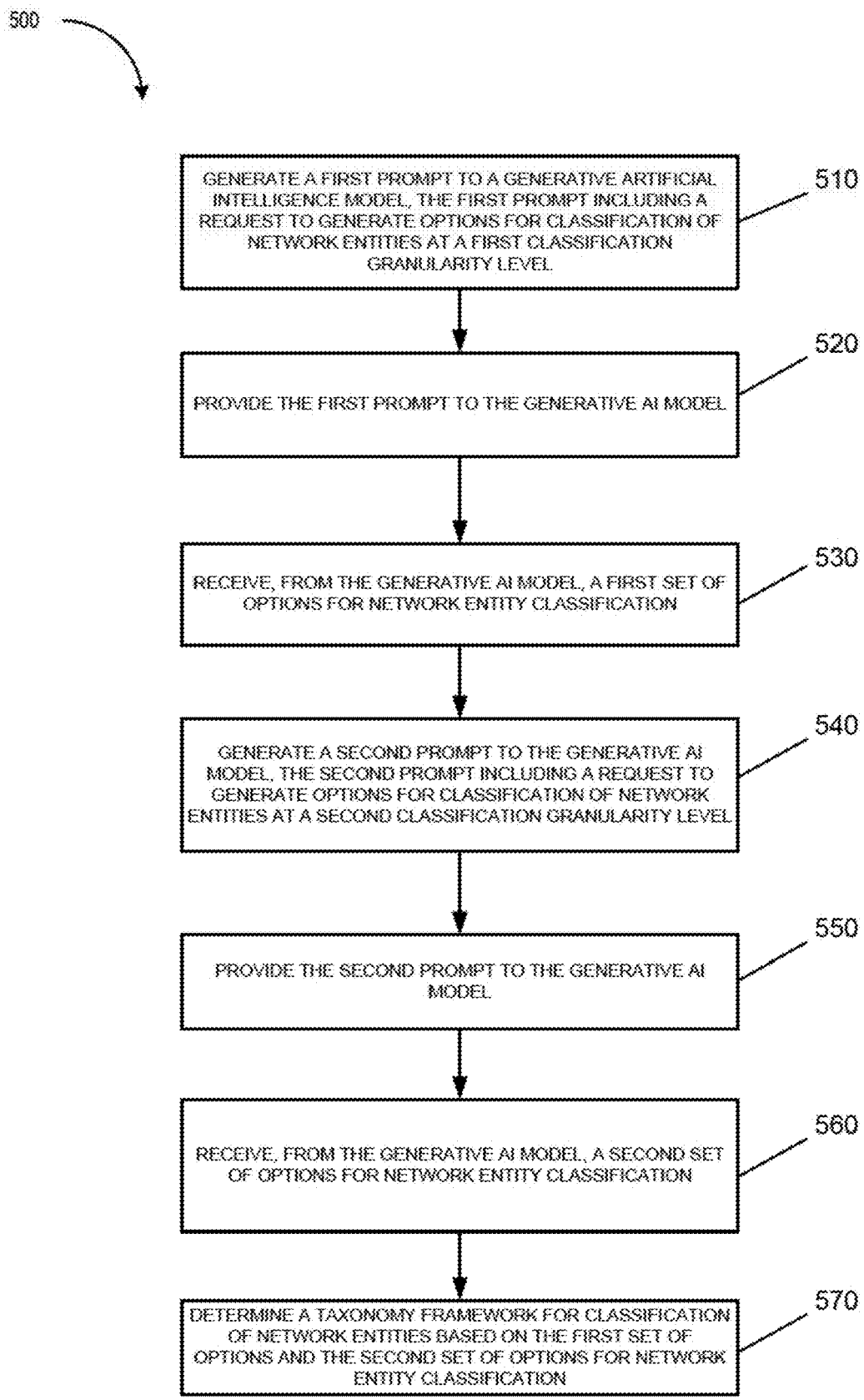
FIG. 5 depicts a flow diagram of an example method of taxonomy framework generation using a generative artificial intelligence (AI) model, according to some embodiments of the present disclosure.

FIG. 5 depicts a flow diagram of aspects of process 500 of taxonomy framework generation using a generative artificial intelligence (AI) model in accordance with one implementation of the present disclosure. Various portions of process 500 may be performed by different components of an entity or device.

Process 500 begins at block 510, where processing logic generates a first prompt to a generative AI model, the first prompt including a request to generate options for classification of network entities at a first classification granularity level. In some embodiments, the generative AI model is a large language model or other semantic based generative AI model. At block 520, processing logic provides the first prompt to the generative AI model. For example, the processing logic may provide the first prompt to a graphical user interface of the generative AI model. At block 530, processing logic receives, from the generative AI model, a first set of options for network entity classification.

At block 540, processing logic generates a second prompt to the generative AI mode, the second prompt including a request to generate options for classification of network entities at a second classification granularity level. At block 550, processing logic provides the second prompt to the generative AI model.

At block 560, processing logic receives, from the generative AI model, a second set of options for network entity classification. In some embodiments, the processing logic may iteratively generate additional prompts to the generative AI model including requests for additional options for classification of network entities at additional classification granularity levels and provide the additional prompts to the generative AI model. The processing logic may also receive, from the generative AI model, additional sets of options for network entity classification at various classification granularity levels. In some embodiments, each of the additional prompts is generated for a previously generated option for classification at a broader granularity level of the taxonomy framework than the previously generation option. In some embodiments, additional prompts are generated for each branch of a taxonomy framework (e.g., a taxonomy tree) until no additional options are available to add to the classification tree.

At block 570, processing logic determines a taxonomy framework for classification of network entities based on the first set of options and the second set of options for network entity classification. In some embodiments, the processing logic may further determine the taxonomy framework for classification of network entities further based on the additional sets of options for classification of network entities at additional classification granularity levels generated in response to the additional and iterative prompting of the AI model.

In some embodiments, the taxonomy framework includes a classification tree (e.g. as depicted in FIG. 4) in which each level of the classification tree comprises a different granularity of classification. Additionally, the first classification granularity level of the taxonomy framework may be broader than the second classification granularity level of the taxonomy framework. In some embodiments, processing logic may identify a previously generated taxonomy framework and determining the taxonomy framework for classification of network entities by modifying the previously generated taxonomy framework based on the first set of options and the second set of options for network entity classification.

Figure 6:
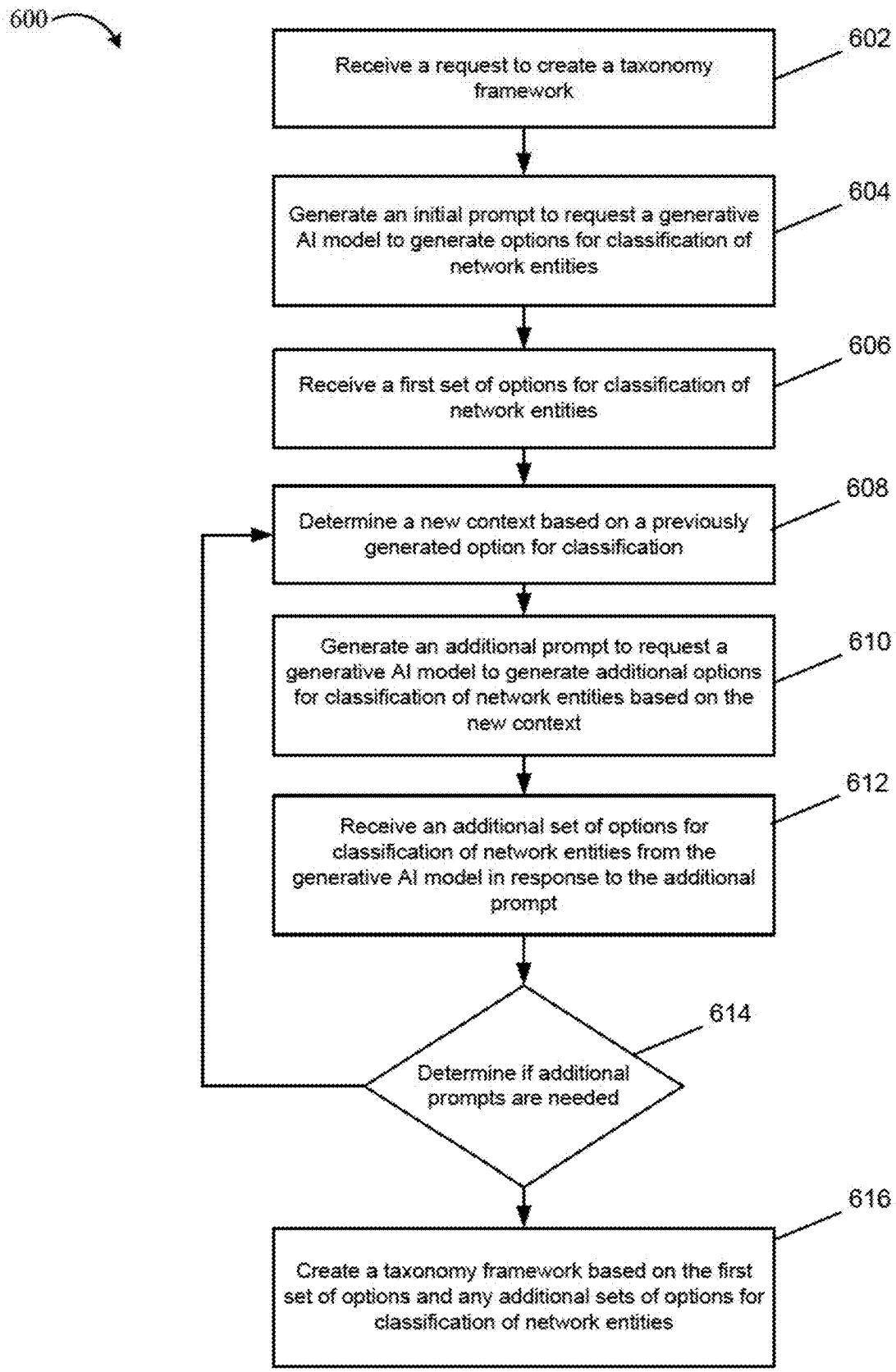
FIG. 6 depicts a flow diagram illustrating another example method of taxonomy framework generation using iterative prompting of a generative AI model, according to some embodiments of the present disclosure.

FIG. 6 depicts a flow diagram of aspects of another example process 600 for device classification within a taxonomy framework and management of the taxonomy framework using an AI model, in accordance with one implementation of the present disclosure. Various portions of process 600 may be performed by different components of an entity or device.

Process 600 begins at block 602, where processing logic receives a request to create a taxonomy framework. In some embodiments, the request may be received from a client device or user to generate a taxonomy framework. In some embodiments, the request may be received in an automated fashion without manual intervention to generate, update, or manage the taxonomy tree. For example, a network monitoring system may generate the request in response to an amount of time since the last taxonomy framework generation or update to produce an up to date taxonomy framework.

At block 604, processing logic generates an initial prompt to request a generative AI model to generate options for classification of network entities. The initial prompt may include a general context such as within the context, generally, of network entities or devices. In other examples, rather than an initial prompt, an initial set of classifications may be provided or defined from which the taxonomy framework can then proceed to be generated.

At block 606, processing logic receives a first set of options for classification of network entities from the generative AI model. For example, the first set of options may include a first broad level of network entity classifications (e.g., IT or OT devices as depicted in FIG. 5).

At block 608, processing logic determines a new context for generating classification options based on a previously generated option for classification. The new context may be one of the options that have previously been generated. For example, after IT or OT classifications are determined, a prompt may be created and provided to the AI model to determine more specific entity categories within each of those contexts (e.g., types of IT devices and types of OT devices). Additionally, after the generation of each additional set of options, prompts can iteratively be generated for each of the new contexts corresponding to the options of the set of options received as well to further define categories within those contexts.

At block 610, processing logic generates an additional prompt to request the generative AI model to generation additional options for classification of network entities within the new context. As discussed above, each of the additional prompts may be generated to provide further options, classifications, categories, etc. within the context of another broader category until a final most granular set of options is determined, resulting in a leaf node within the taxonomy tree. For example, each branch may terminate in a leaf node when the AI model is no longer able to return additional options for a context. At block 612, processing logic receives an additional set of options for classification of network entities from the generative AI model in response to the additional prompt.

At block 614, processing logic determines if additional prompts are to be generated for further classification option generation. If additional prompts are needed, the process returns to repeat blocks 608 through 612 for additional contexts (e.g., for further narrowing options within the context of a previously generated option. If additional prompts are not needed and all potential classification options have been generated, the process proceeds to block 616, where processing logic creates a taxonomy framework based on the first set of options and any additional sets of options for classification of network entities received from the generative AI model.

Figure 7:
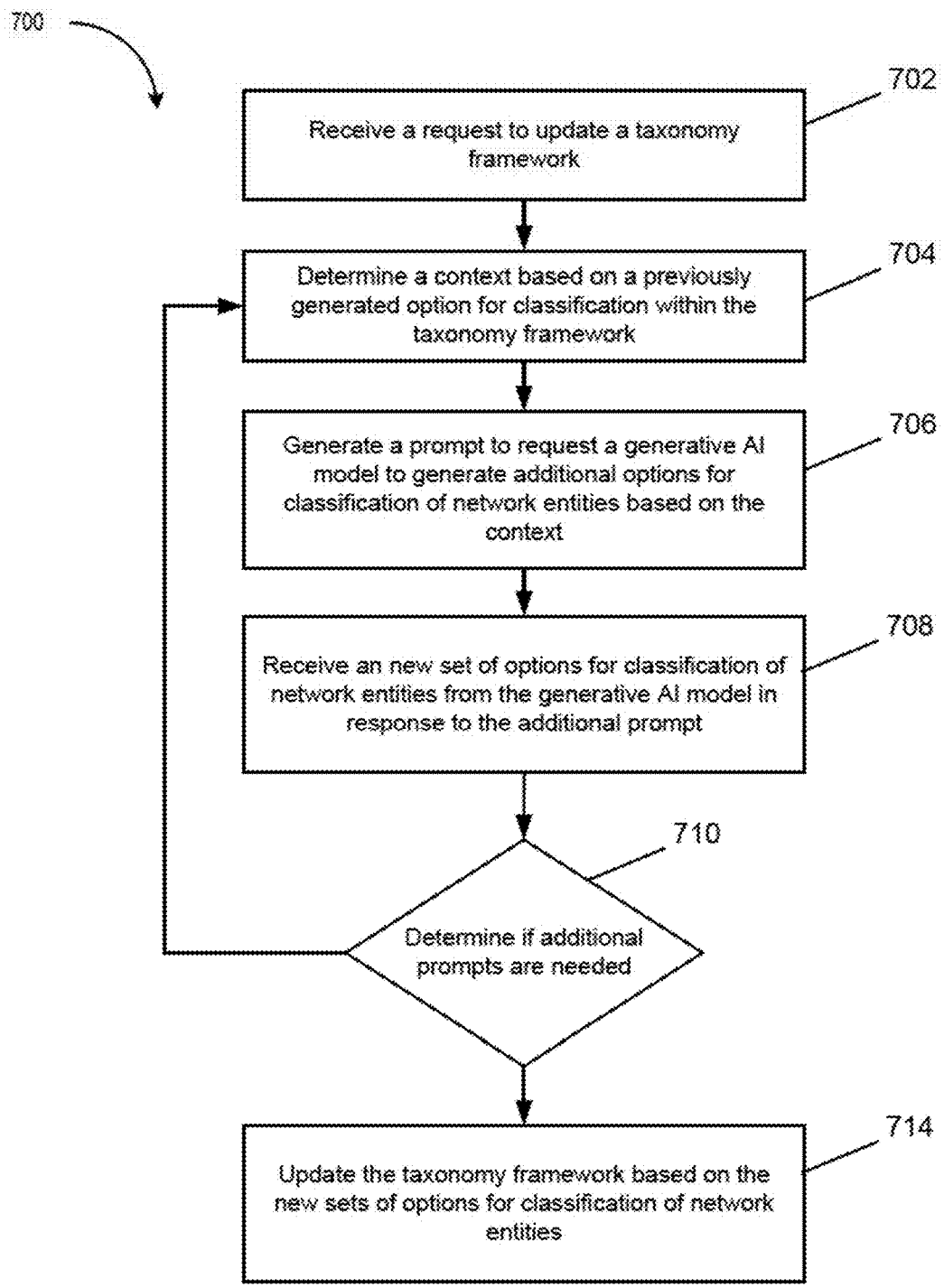
FIG. 7 depicts a flow diagram illustrating an example method of dynamically updating and managing a defined taxonomy framework, according to some embodiments of the present disclosure.

FIG. 7 depicts a flow diagram of aspects of process 700 for classification of a entity coupled to a network via an AI model using a defined taxonomy framework, in accordance with one implementation of the present disclosure. Various portions of process 700 may be performed by different components of an entity or device.

Process 700 begins at block 702, where processing logic receives a request to update a taxonomy framework. In some embodiments, the request may be received from a client device or user to generate a taxonomy framework. In some embodiments, the request may be received in an automated fashion without manual intervention to update or manage the taxonomy tree. For example, a network monitoring system may generate the request in response to an amount of time since the last taxonomy framework update to produce an up-to-date taxonomy framework.

At block 704, processing logic determines a context based on a previously generated option for classification within the taxonomy framework. For example, the processing logic identifies a category of the taxonomy tree that is to be updated with new or additional classification categories. For example, a branch of the taxonomy tree of the taxonomy framework may be out of date because new devices have been released. Accordingly, the processing logic may identify such branches that need to be updated and use those branches as the starting context to update the taxonomy tree.

At block 706, processing logic generates a prompt to request a generative AI model to generate additional options for classification of network entities based on the context. For example, the request may request additional options or new options within the context of the selected branch.

At block 708, processing logic receives a new set of options for classification of network entities from the generative AI model in response to the additional prompt. At block 710, processing logic determines if additional prompts should be generated to complete the taxonomy framework. If additional prompts are needed, the process returns to repeat blocks 704 through 708 to generate additional classification options for the taxonomy framework. If no additional prompts are needed, the process proceeds to block 714, where processing logic updates the taxonomy framework based on the new sets of options for classification of network entities received from the generative AI model. In some embodiments, processing logic identifies the differences between the original taxonomy tree and the additional options received from the generative AI model. The processing logic may then update the original taxonomy tree with the different or additional classification options identified by the generative AI model.

Figure 8:
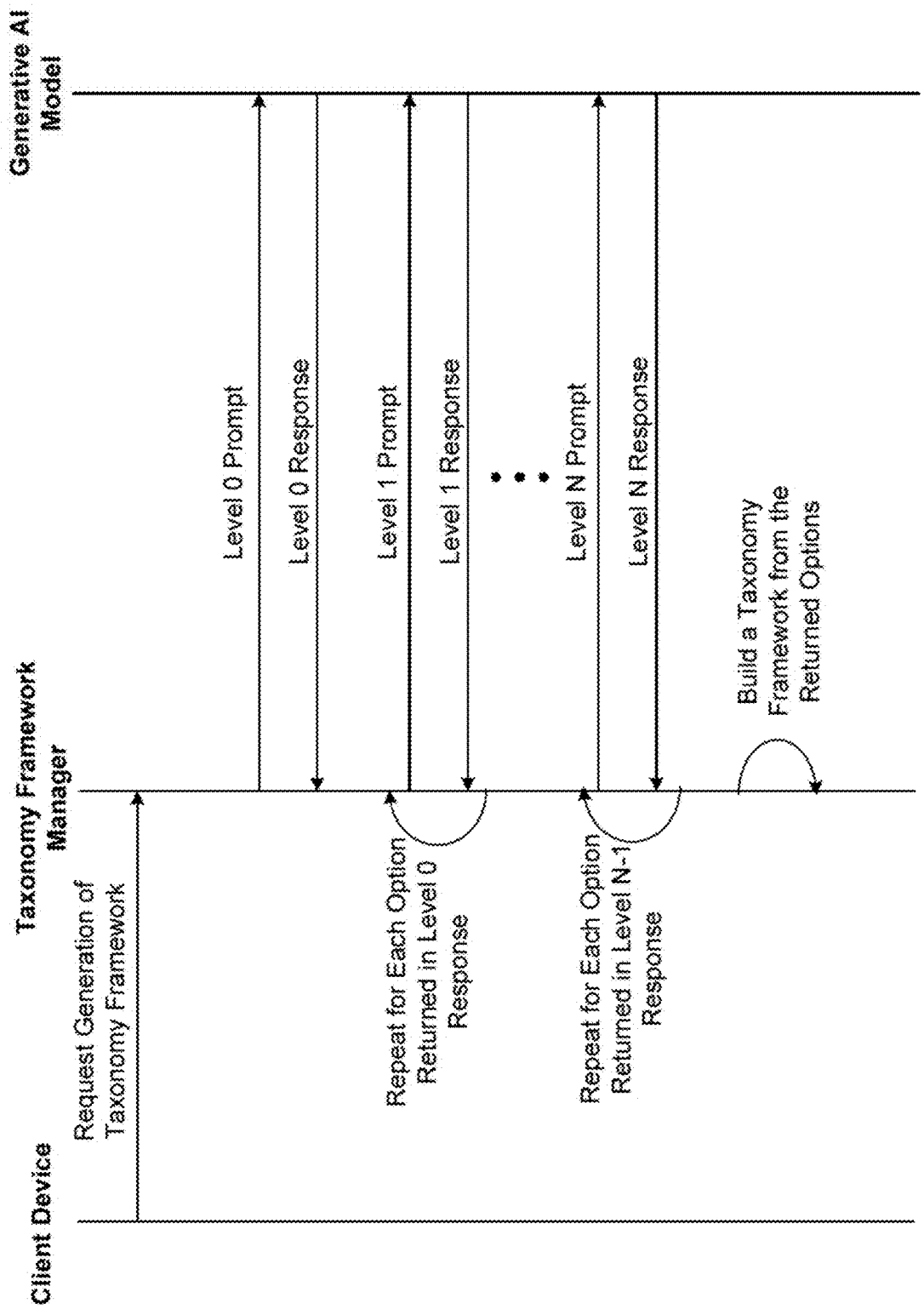
FIG. 8 depicts an example workflow for generating a taxonomy framework, according to some embodiments of the present disclosure.

FIG. 8 depicts example workflow for generating a taxonomy framework using a generative AI model, according to some embodiments of the present disclosure. In some embodiments, a client device transmits a request to a taxonomy framework manager to generate a taxonomy framework. The request may include an indication for the type of taxonomy framework to be created, such as an indication to generate a taxonomy framework for classifying network entities. The taxonomy framework manager may, in response, iteratively generate prompts to a generative AI model to obtain sets of options for classification at various classification levels (e.g., classification granularities). For example, as depicted, the taxonomy framework manager may generate a first prompt (e.g., level 0 prompt) to the generative AI model and receive a response (e.g., level 0 response). The response may include a set of categories (e.g., classification options) for an entity at a first level (level 0) in a taxonomy framework. After receiving the level 0 response, the taxonomy framework may generate, for each of the categories received in the level 0 response, as additional prompt (level 1 prompt). Accordingly, one or more level 1 responses can be received by the taxonomy framework manager, each corresponding to one of the level 0 response categories. This process may be performed iteratively for any number of levels of categories (e.g., classification granularity), each additional level having a finer granularity (e.g., more specificity) of categories than the prior level. It should be noted that not every branch in the taxonomy framework will include the same number of levels as some categories may not include further classification granularity, as can be seen in FIG. 4. Once the taxonomy framework manager completes the iterative prompting for classification options, the taxonomy framework manager may build the taxonomy framework (e.g., as a taxonomy tree). The taxonomy framework may then be used by one or more classification models to classify an entity within the framework using information collected for the entity by, for example, a network monitor as described with respect to FIGS. 1 and 2.

Figure 9:
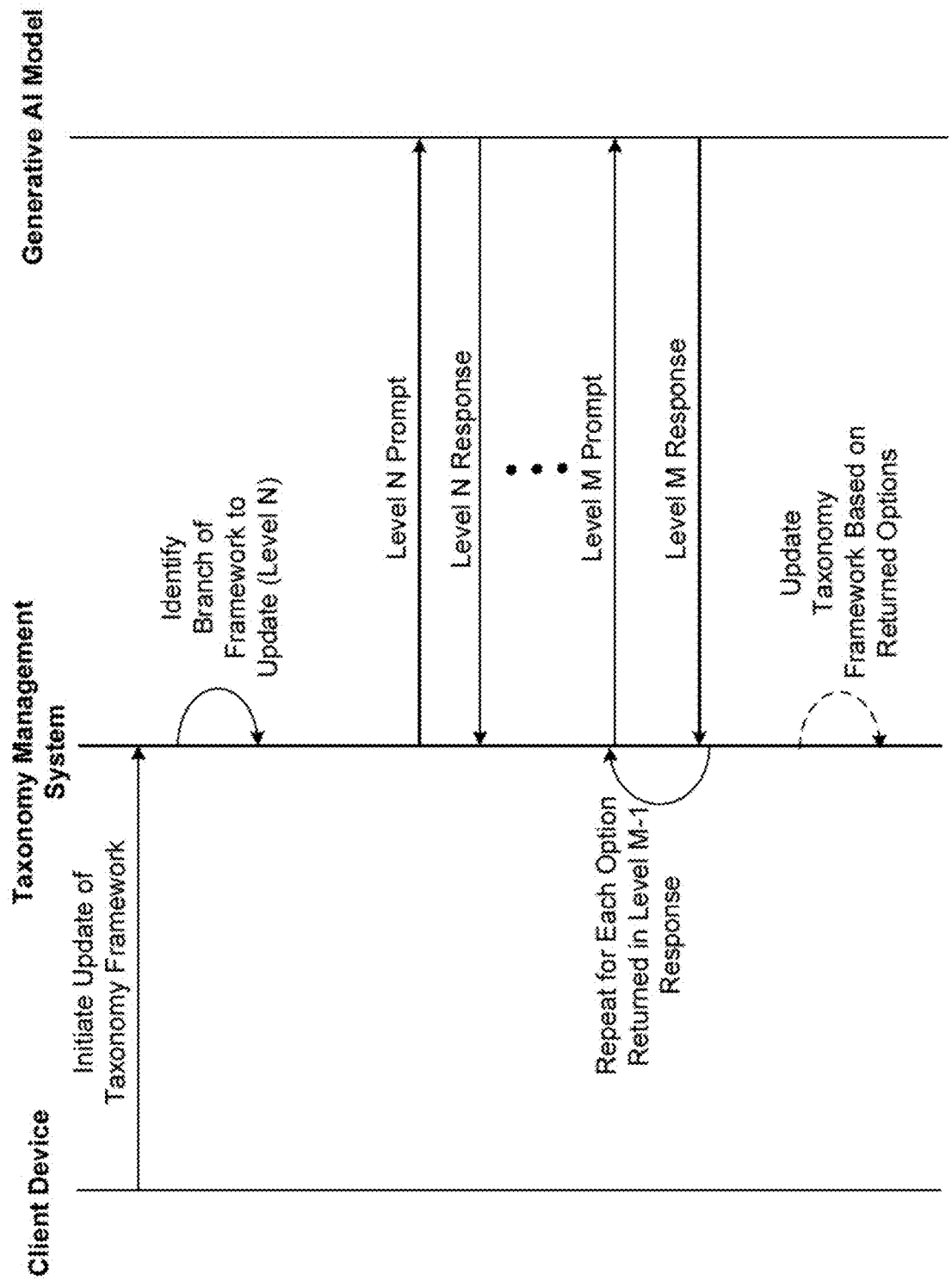
FIG. 9 depicts an example workflow for updating an existing taxonomy framework, according to some embodiments of the present disclosure.

FIG. 9 depicts an example workflow for updating and managing, via a generative AI model, an existing taxonomy framework for entity classification, according to some embodiments of the present disclosure. In some embodiments, a client device initiates an update of a previously defined taxonomy framework. The client device may also provide an indication of a portion of the taxonomy framework for updating. The taxonomy management system may then identify a branch of the taxonomy framework to update. For example, the identified branch may operate as the starting point for an iterative prompting of the generative AI model to obtain new or additional classification options or categories for within the context of the identified branch. In some embodiments, after identified the branch for update, which may include the entire taxonomy framework or a sub-portion of the framework, the taxonomy management system generates an initial prompt for the level N category (e.g., within the level N context of the selected branch) to obtain a level N response including one or more classification options or categories. As discussed above, the taxonomy management system may then repeat, for each additional level for the framework, the prompting of the generative AI model for new or additional classification options at the corresponding level in the taxonomy framework. Once the iterative prompting is complete, the taxonomy management system may then perform an update of the taxonomy framework based on the received options at the various granularity levels of classification. In some embodiments, the taxonomy management system may identify the differences between the new or additional categories and the original taxonomy framework and then update the taxonomy framework to include the differences. Accordingly, the taxonomy framework can be easily and automatically updated (e.g., intermittently, continuously, etc. without human intervention) allowing the scalability of management of the taxonomy framework as new devices are released.

Figure 10:
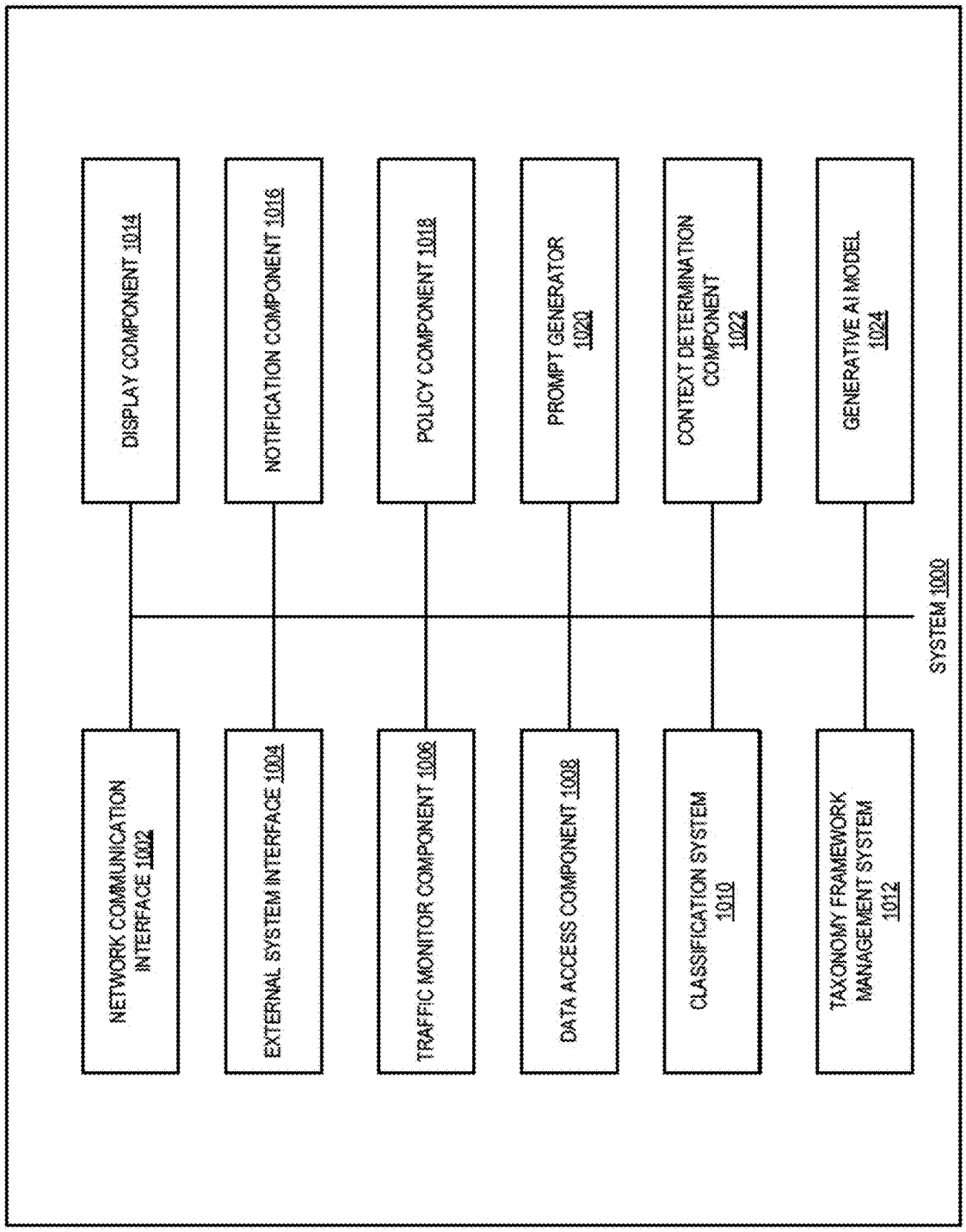
FIG. 10 depicts a component diagram for generating a taxonomy framework for network entity classification, according to embodiments of the present disclosure.

FIG. 10 depicts illustrative components of a system for generating a taxonomy framework for network entity classification, in accordance with one implementation of the present disclosure. Example system 1000 includes a network communication interface 1002, an external system interface 1004, a traffic monitor component 1006, a data access component 1008, a classification system 1010, a taxonomy framework management system 1012, a display component 1014, a notification component 1016, a policy component 1018, prompt generator 1020, a context determination component 1022, and an AI classification model 1024. The components of system 1000 may be part of a computing system or other electronic device (e.g., network monitor entity 102) or a virtual machine or device and be operable to monitor one or more entities communicatively coupled to a network, monitor network traffic, generate and manage a taxonomy framework via a generative AI model, or perform one or more actions (e.g., security action, remediation action, etc.), as described herein. For example, the system 1000 may further include a memory and a processing device, operatively coupled to the memory, which may perform the operations of or execute the components of system 1000. The components of system 1000 may access various data and characteristics or features associated with an entity (e.g., network communication information) and data associated with one or more entities. It is appreciated that the modular nature of system 1000 may allow the components to be independent and allow flexibility to enable or disable individual components or to extend, upgrade, or combination thereof components without affecting other components thereby providing scalability and extensibility. System 1000 may perform one or more blocks of flow diagrams 500-900. In some embodiments, the components of 1000 may be part of network monitor device (e.g., network monitor entity 102), in the cloud, or the various components may be distributed between local and cloud resources.

Communication interface 1002 is operable to communicate with one or more entities (e.g., network device 104) coupled to a network that are coupled to system 1000 and receive or access information about entities (e.g., device information, device communications, device characteristics, features, etc.), access information as part of a passive scan, send one or more requests as part of an active scan, receive active scan results or responses (e.g., responses to requests), as described herein. The communication interface 1002 may be operable to work with one or more components to initiate access to sources of device characteristics for determination of characteristics of an entity to allow determination of one or more features which may then be used for device compliance, asset management, standards compliance, classification, identification, risk assessment or analysis, vulnerability assessment or analysis, etc., as described herein.

Communication interface 802 may be used to receive and store network traffic for entity classification via an AI model using a defined taxonomy framework, as described herein.

External system interface 1004 is operable to communicate with one or more third party, remote, or external systems to access information including characteristics or features of an entity (e.g., to be used to determine a security aspects) or cyber threat intelligence. External system interface 1004 may further store the accessed information in a data store. For example, external system interface 1004 may access information from a vulnerability assessment (VA) system to enable determination of one or more compliance or risk characteristics associated with an entity. External system interface 1004 may be operable to communicate with a vulnerability assessment (VA) system, an advanced threat detection (ATD) system, a mobile device management (MDM) system, a firewall (FW) system, a switch system, an access point (AP) system, etc. External system interface 1004 may query a third-party system using an API or CLI. For example, external system interface 1004 may query a firewall or a switch for information (e.g., network session information) about an entity or for a list of entities that are communicatively coupled to the firewall or switch and communications associated therewith. In some embodiments, external system interface 1004 may query a switch, a firewall, or other system for information of communications associated with an entity.

Traffic monitor component 806 is operable to monitor network traffic to monitor network traffic associated with entities coupled to a network. Traffic monitor component 1006 may have a packet engine operable to access packets of network traffic (e.g., passively) and analyze the network traffic. The traffic monitor component 1006 may further be able to access and analyze traffic logs from one or more entities (e.g., network device 104, system 150, or aggregation device 106) or from an entity being monitored. The traffic monitor component 1006 may further be able to access traffic analysis data associated with an entity being monitored, e.g., where the traffic analysis is performed by a third-party system.

Data access component 1008 may be operable for accessing data including metadata associated with one or more network monitoring entities (e.g., network monitor entities 102), including features that the network monitoring entity is monitoring or collecting, software versions (e.g., of a profile library of the network monitoring entity), and the internal configuration of the network monitoring entity. The data accessed by data access component 1008 may be used by embodiments for taxonomy framework generation using a generative AI model and using the taxonomy framework for entity classification. Data access component 808 may further access vertical or environment data and other user associated data, including vertical, environment, common type of entities for the network or network portions, segments, areas with classification issues, etc., which may be used for classification.

Data access component 1008 may access data associated with active or passive traffic analysis or scans or a combination thereof. Information accessed by data access component 1008 may be stored, displayed, and used as a basis for entity classification via based on a taxonomy framework generated via iterative prompting of a generative AI model, as described herein.

Classification system 1010 may identify, retrieve, receive, or otherwise obtain information associated with a device or entity to be classified (e.g., via data access component 1008, traffic monitor component 1006, etc.). In some embodiments, classification system 1010 may perform a classification of a device or entity using a defined taxonomy framework, such as a taxonomy framework generated as described herein. For example, the classification system 1010 may provide the information associated with an entity to a classifier that performs a classification within the context of the taxonomy framework. In some embodiments, the classification system 1010 may prompt an AI classification model for the device or entity to be classified within the taxonomy framework. For example, the classification system 1010 may generate a first prompt to an AI classification model including the information associated with the device and options for classification of the device within a first level of the taxonomy framework. The prompt may request the AI classification model to select from one of the options for classification of the device based on the information associated with the device. The information may include device properties, characteristics, etc. or may include a name or identifier of the device. Upon receiving a response to the query from the AI classification model, the classification system 1010 may generate another query to select from a set of options for classification at a second more granular and specific level of the taxonomy framework. For example, the second set of options of the second query may include a subclassification under the umbrella of the first selected classification. Accordingly, the classification system 1010 may continue to generate prompts until a leaf node of the taxonomy framework is reached or until the AI classification model is unable to select from one of the options. For example, if the device cannot be classified into one of the options provided by a prompt, the AI classification model may determine a new classification of the device. The classification system 1010 may communicate with the taxonomy framework management system to then update the taxonomy framework to include the new classification the device. Therefore, the classification system 1010 may classify devices and assist with dynamically updating the taxonomy framework as unknown or new devices are identified.

Taxonomy framework management system 1012 may manage the initial generation and management (e.g., updating) of a taxonomy framework. In some embodiments, the taxonomy framework management system 1012 may instruct a prompt generator 1020 to iteratively generate prompts to a generative AI model 1024 to identify classification categories at various levels of granularity. For example, for each previously identified category in a framework, the taxonomy framework management system 1012 may instruct the prompt generator 1020 to generate a prompt based on a context (e.g., a context of the identified category) determined by the context determination component 1022. Thus, the AI model 1024 may respond with a set of options for entity classification within the context identified by the determination component 1022. In other words, the prompt is curated to generate options within the identified context. Similarly, the taxonomy framework management system 1012 may update a previously generated taxonomy framework, or at least a portion of the previously generated taxonomy framework, in a similar manner as discussed above.

Figure 11:
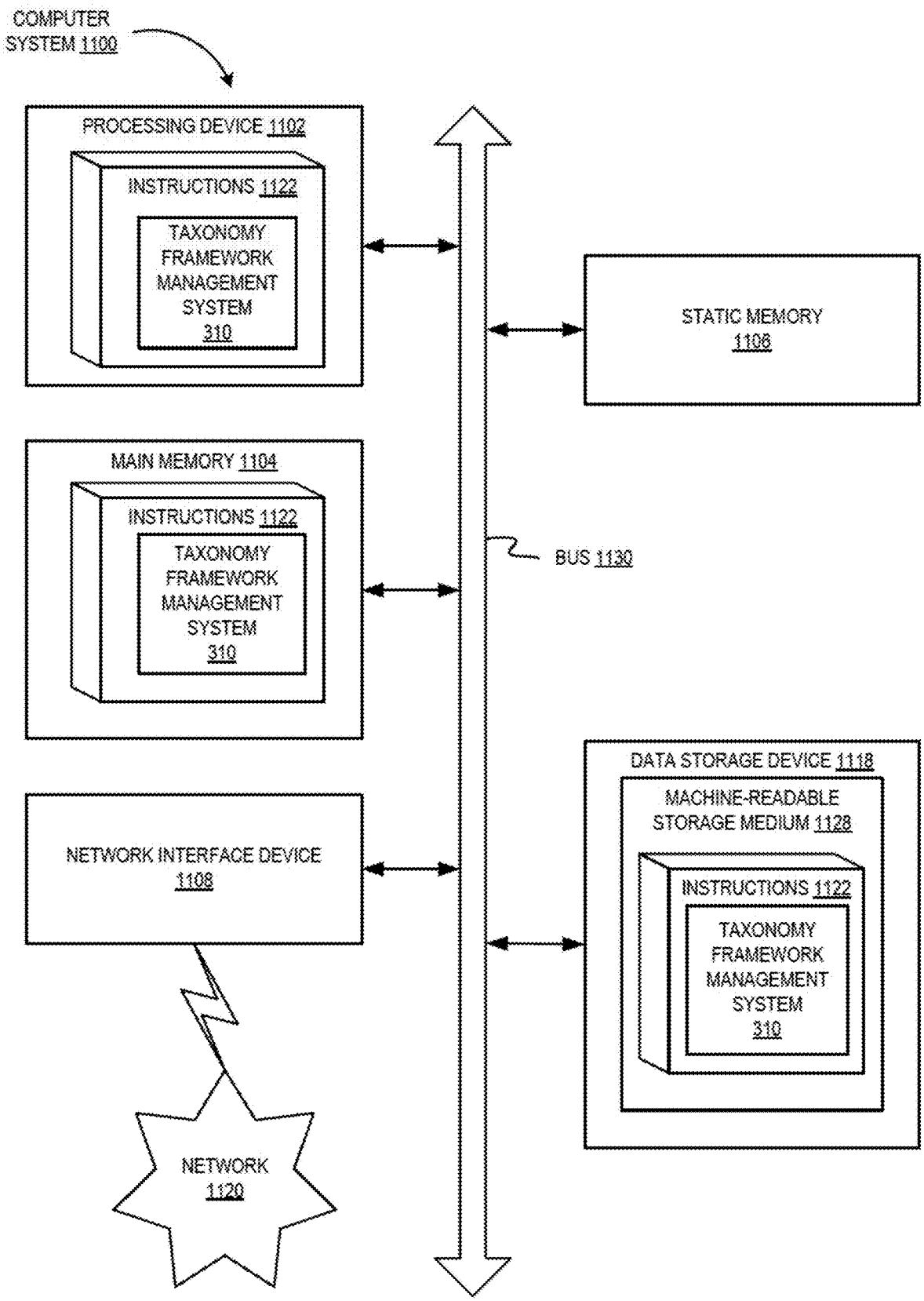
FIG. 11 is a block diagram illustrating an example computer system, in accordance with one implementation of the present disclosure.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1100 may be representative of a server, such as network monitor entity 102 running system 1000 to generate a taxonomy framework for network entity classification using a generative AI model.

The exemplary computer system 1100 includes a processing device 1102, a main memory 1104 (e.g., read-only memory (ROM), flash memory, dynamic random access memory (DRAM), a static memory 1106 (e.g., flash memory, static random access memory (SRAM), etc.), and a data storage device 1118, which communicate with each other via a bus 1130. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1122, which may be one example of process 500, 600, 700, 800, or 900 of FIGS. 5-9 or system 1000 shown in FIG. 10, for performing the operations and steps discussed herein.

The data storage device 1118 may include a machine-readable storage medium 1128, on which is stored one or more set of instructions 1122 (e.g., software) embodying any one or more of the methodologies of operations described herein, including instructions 1122 to cause the processing device 1102 to generate a taxonomy framework for network entity classification using a generative AI model. The instructions 1122 may also reside, completely or at least partially, within the main memory 1104 or within the processing device 1102 during execution thereof by the computer system 1100; the main memory 1104 and the processing device 1102 also constituting machine-readable storage media. The instructions 1122 may further be transmitted or received over a network 1120 via the network interface device 1108.

The machine-readable storage medium 1128 may also be used to store instructions to generate and manage a taxonomy framework for network entity classification using a generative AI model, as described herein. While the machine-readable storage medium 1128 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
  receiving, from a device on a network, a first set of options for network entity classification at a first classification granularity level;
  generating a prompt to a generative artificial intelligence (AI) model, the prompt comprising a request to generate options for classification of network entities at a second classification granularity level;
  receiving, from the generative AI model, a second set of options for the network entity classification;
  determining, by a processing device, a taxonomy framework for the classification of the network entities based on the first set of options and the second set of options for the network entity classification;
  classifying a network entity based on information about the network entity and the taxonomy framework; and
  performing a security action with respect to the network entity based on the classification of the network entity.

2. The method of claim 1, further comprising:
  iteratively generating additional prompts to the generative AI model comprising requests for additional options for the classification of the network entities at additional classification granularity levels;
  providing the additional prompts to the generative AI model; and
  receiving, from the generative AI model, additional sets of options for the network entity classification at various classification granularity levels; wherein determining the taxonomy framework for the classification of the network entities is further based on the additional sets of options for the classification of the network entities at the additional classification granularity levels.

3. The method of claim 2, wherein each of the additional prompts is generated for a previously generated option for the classification at a broader granularity level of the taxonomy framework than a granularity level of the previously generation option.

4. The method of claim 3, wherein the taxonomy framework comprises a classification tree in which each level of the classification tree comprises a different granularity of classification, and wherein the first classification granularity level of the taxonomy framework is broader than the second classification granularity level of the taxonomy framework.

5. The method of claim 4, wherein the generative AI model comprises a large language model.

6. The method of claim 4, wherein the additional prompts are generated for each branch of the classification tree until no additional options are available to add to the classification tree.

7. The method of claim 1, further comprising:
  identifying a previously generated taxonomy framework, wherein determining the taxonomy framework for the classification of the network entities by comprises modifying the previously generated taxonomy framework based on the first set of options and the second set of options for the network entity classification.

8. A system comprising:
  a memory; and
  a processing device, operatively coupled to the memory, to:
    receive, from a device on a network, a first set of options for network entity classification at a first classification granularity level;
    generate a prompt to a generative artificial intelligence (AI) model, the prompt comprising a request to generate options for classification of network entities at a second classification granularity level;
    receive, from the generative AI model, a second set of options for the network entity classification;
    determine a taxonomy framework for the classification of the network entities based on the first set of options and the second set of options for the network entity classification;
    classify a network entity based on information about the network entity and the taxonomy framework; and
    perform a security action with respect to the network entity based on the classification of the network entity.

9. The system of claim 8, wherein the processing device is further to:
  iteratively generate additional prompts to the generative AI model comprising requests for additional options for the classification of the network entities at additional classification granularity levels;
  provide the additional prompts to the generative AI model; and
  receive, from the generative AI model, additional sets of options for the network entity classification at various classification granularity levels, wherein to determine the taxonomy framework for the classification of the network entities, the processing device is to determine the taxonomy framework further based on the additional sets of options for the classification of the network entities at the additional classification granularity levels.

10. The system of claim 9, wherein each of the additional prompts is generated for a previously generated option for the classification at a broader granularity level of the taxonomy framework than a granularity level of the previously generation option.

11. The system of claim 10, wherein the taxonomy framework comprises a classification tree in which each level of the classification tree comprises a different granularity of classification, and wherein the first classification granularity level of the taxonomy framework is broader than the second classification granularity level of the taxonomy framework.

12. The system of claim 11, wherein the generative AI model comprises a large language model.

13. The system of claim 11, wherein the additional prompts are generated for each branch of the classification tree until no additional options are available to add to the classification tree.

14. The system of claim 8, wherein the processing device is further to:
identify a previously generated taxonomy framework, wherein to determine the taxonomy framework for the classification of the network entities, the processing device is to by modify the previously generated taxonomy framework based on the first set of options and the second set of options for the network entity classification.

15. A non-transitory computer readable storage medium including instructions that, when executed by a processing device, cause the processing device to:
receive, from a device on a network, a first set of options for network entity classification at a first classification granularity level;
generate a prompt to a generative artificial intelligence (AI) model, the prompt comprising a request to generate options for classification of network entities at a second classification granularity level;
receive, from the generative AI model, a second set of options for the network entity classification;
determine, by the processing device, a taxonomy framework for the classification of the network entities based on the first set of options and the second set of options for the network entity classification; and
classify a network entity based on information about the network entity and the taxonomy framework; and
perform a security action with respect to the network entity based on the classification of the network entity.

16. The non-transitory computer readable storage medium of claim 15, wherein the instructions, when executed by the processing device, cause the processing device further to:
iteratively generate additional prompts to the generative AI model comprising requests for additional options for the classification of the network entities at additional classification granularity levels;
provide the additional prompts to the generative AI model; and
receive, from the generative AI model, additional sets of options for the network entity classification at various classification granularity levels, wherein to determine the taxonomy framework for the classification of the network entities, the instructions, when executed by the processing device, cause the processing device to determine the taxonomy framework further based on the additional sets of options for the classification of the network entities at the additional classification granularity levels.

17. The non-transitory computer readable storage medium of claim 16, wherein each of the additional prompts is generated for a previously generated option for the classification at a broader granularity level of the taxonomy framework than a granularity level of the previously generation option.

18. The non-transitory computer readable storage medium of claim 17, wherein the taxonomy framework comprises a classification tree in which each level of the classification tree comprises a different granularity of classification, and wherein the first classification granularity level of the taxonomy framework is broader than the second classification granularity level of the taxonomy framework.

19. The non-transitory computer readable storage medium of claim 18, wherein the generative AI model comprises a large language model.

20. The non-transitory computer readable storage medium of claim 18, wherein the additional prompts are generated for each branch of the classification tree until no additional options are available to add to the classification tree.

* * * * *